US009649706B2

(12) United States Patent
Ursuliak (10) Patent No.: US 9,649,706 B2
(45) Date of Patent: May 16, 2017

(54) MULTI-SURFACE OBJECT END MANUAL FILING TOOL

(71) Applicant: Taras Ursuliak, Sherwood Park (CA)

(72) Inventor: Taras Ursuliak, Sherwood Park (CA)

( * ) Notice: Subject to any disclaimer, the term of this patent is extended or adjusted under 35 U.S.C. 154(b) by 285 days.

(21) Appl. No.: 14/246,473

(22) Filed: Apr. 7, 2014

(65) Prior Publication Data

US 2015/0283632 A1    Oct. 8, 2015

(51) Int. Cl.
| | | |
|---|---|---|
| *B24B 9/00* | (2006.01) | |
| *B24D 15/00* | (2006.01) | |
| *B24D 15/04* | (2006.01) | |
| *B24D 15/02* | (2006.01) | |
| *B23D 71/04* | (2006.01) | |
| *B23D 71/10* | (2006.01) | |
| *B23D 71/08* | (2006.01) | |

(52) U.S. Cl.
CPC ............ *B23D 71/08* (2013.01); *B23D 71/04* (2013.01); *B24B 9/00* (2013.01); *B24D 15/00* (2013.01); *B23D 71/10* (2013.01); *B24B 9/007* (2013.01); *B24D 15/04* (2013.01); *B24D 15/045* (2013.01); *Y10T 29/44* (2015.01); *Y10T 29/442* (2015.01); *Y10T 29/444* (2015.01); *Y10T 29/446* (2015.01); *Y10T 29/448* (2015.01); *Y10T 29/45* (2015.01)

(58) Field of Classification Search
CPC ........ B23D 71/08; B23D 71/04; B23D 71/10; B23D 71/00; B24B 9/00; B24B 9/007; B24D 15/00; B24D 15/02; B24D 15/04; B24D 15/045; Y10T 29/44–29/448
USPC .......... 29/76.1–76.4; 451/552, 555, 523, 461
See application file for complete search history.

(56) References Cited

U.S. PATENT DOCUMENTS

| | | | |
|---|---|---|---|
| 1,725,439 A | | 3/1927 | Carns |
| 2,277,639 A | | 10/1940 | Hamilton |
| 2,243,757 A | * | 5/1941 | Kohls ............... B23D 67/00 29/76.3 |
| 2,906,612 A | * | 9/1959 | Anthony ............ B23D 73/00 428/601 |
| 3,874,126 A | | 4/1975 | Catlin |

(Continued)

FOREIGN PATENT DOCUMENTS

| | | |
|---|---|---|
| EP | 99308841 | 9/1988 |
| EP | 02076896 | 5/2002 |
| EP | 1488889 A3 | 5/2004 |

*Primary Examiner* — Christopher Besler
*Assistant Examiner* — Bayan Salone
(74) *Attorney, Agent, or Firm* — Steven R. Gray; Holland & Hart LLP (57) ABSTRACT

A device for filing and/or abrading the multiple surfaces and/or edges of an object end so that they are less sharp, rough, dangerous, or so that they better conform to a desired shape. Embodiments of the device may comprise filing surfaces for filing the multiple object surfaces and/or edges thereof without requiring substantial repositioning of either the device or the object with surfaces and/or edges being filed. Moreover, embodiments of the device may be useful for filing sets of both the inner and outer object surfaces and/or edges thereof without requiring substantial repositioning of either the device or the object, and therefore in a more efficient and less dangerous manner. It is anticipated that some embodiments may comprise filing surfaces arranged in a manner configured to file the surfaces and/or edges of a strut end.

26 Claims, 5 Drawing Sheets

(56) References Cited

U.S. PATENT DOCUMENTS

| | | | | |
|---|---|---|---|---|
| 4,391,013 A * | 7/1983 | Janssen | ................... | B05C 17/10 |
| | | | | 15/105.5 |
| 4,399,170 A * | 8/1983 | Janssen | ................... | B05C 17/10 |
| | | | | 156/71 |
| 5,445,050 A * | 8/1995 | Owens | ................. | B24D 15/066 |
| | | | | 451/392 |
| 5,569,064 A * | 10/1996 | Gleadall | .............. | B24D 15/066 |
| | | | | 451/558 |
| 5,678,292 A * | 10/1997 | Kimbel | ................... | B23B 31/11 |
| | | | | 173/47 |
| 5,957,765 A | 9/1999 | Kimbel | | |
| 6,378,349 B1 | 4/2002 | Waldrop | | |
| 7,047,703 B2 | 5/2006 | Waldrop | | |
| 7,566,191 B2 | 7/2009 | Hooser | | |
| 7,617,608 B2 * | 11/2009 | Zakarian | ................. | B27B 21/02 |
| | | | | 30/507 |
| 8,277,292 B2 | 10/2012 | Whelan | | |
| 8,591,291 B2 * | 11/2013 | Eklund | ................... | B24B 3/546 |
| | | | | 451/162 |
| 2005/0221742 A1 * | 10/2005 | Su | ......................... | B24D 15/02 |
| | | | | 451/555 |
| 2008/0229699 A1 | 9/2008 | Nehls | | |
| 2011/0053473 A1 | 3/2011 | Eklund | | |
| 2012/0192885 A1 * | 8/2012 | Shelton | ................. | A45D 24/30 |
| | | | | 132/200 |
| 2012/0267138 A1 | 10/2012 | Fuenfer | | |

\* cited by examiner

MULTI-SURFACE OBJECT END MANUAL FILING TOOL

FIELD OF INVENTION

The present invention is in the technical field of filing and abrading devices. More particularly, the embodiments of the invention described and shown herein relate to the filing of potentially dangerous object ends having multiple surfaces and edges arranged at substantially nonlinear angles.

BACKGROUND

Various inventions have been created to file or abrade the surfaces and/or edges of objects, particularly when said object surfaces and/or ends are rough or dangerously sharp. Metal files, for example, come in a variety of shapes, materials, and teeth, but most are limited to a similar basic design: an elongated flattened blade having one or more filing surfaces, with forward-facing cutting small teeth on said surface(s). When pressure is applied from the teeth of the metal file to a rough or sharp surface of a work piece and the metal file is pushed over the work piece, the cutting action of the sharp teeth can smooth the surface. Different configurations of teeth facilitate different cutting motions of the metal file. By scratching or rubbing rather than cutting, various abrading devices also have been used to smooth the metal surface of a work piece. In addition, some clamping or similar mechanisms allow easier filing or abrading/sanding by holding the position of a work piece in place. Some motorized devices allow surfaces to be abraded or filed more quickly.

Such traditional metal files, abrading devices, clamping devices, and motorized devices, may be effective at performing their anticipated functions but are not optimally designed for certain applications. Specifically, such prior designs may not be optimal for filing the edges of objects or work pieces having particular geometric shapes in an efficient, safe, and relatively quick and simple manner. Namely, certain work pieces comprising several edges on different non-linearly arranged planes may make filing with prior art files and abrading devices awkward, less efficient, more time-consuming, and more dangerous. Moreover, using prior art devices to file certain edges of such somewhat complex shapes may present difficulty or even risk of injury.

For example, one common object or work piece comprising multiple nonlinear adjacent surfaces having potentially dangerous rough or sharp edges is metal strut. Metal strut is used in a wide variety of commercial and industrial support systems and is usually in the shape of a hollow box channel (usually either 1⅝ inch by 1⅝ inch or 1 inch by 1 inch). Moreover, metal strut is often cut in smaller pieces for customization according to objective and application. The cut edges of the metal strut are often sharp and may pose risk of injury. Several devices have been created with the objective of avoiding this risk of such injury. For example, strut end caps have been created for placement over and covering the ends of a strut. However, when a strut channel is not cut perfectly straight with respect to the latitudinal axis, said end caps may not fit quite correctly. Moreover, heat generated from cutting a metal strut may sometime cause the shape of the metal strut to warp, also resulting in an end cap not fitting correctly. Certain prior art strut channel designs may try and avoid injury from sharp edges, by for example incorporating strut ends that may bend or are less likely to have sharp edges, but may not be as effective at reducing sharp or rough edges when the strut channel is cut, and may not solve the problem of sharp or rough edges when using standard or more common designs of metal strut.

Thus, the edges of cut metal strut are often filed and/or abraded using standard metal files or abrading devices. When trying to file the inside edges of the box with a traditionally-shaped file, however, the motion of the elongated blade may be restricted by the wall of the strut wall opposite from the edge being filed. Similarly, mechanical abrading devices may have designs that make abrading the inside edges of a strut channel awkward and less than optimally effective. In addition, since there often may be no clamp handy to hold the strut in a stable position, cut metal strut being filed may often be held in place by hand, which may increase the risk that an errant strike will cause injury to the hand. Risk of injury is compounded by the fact that cut strut channels may often have sharp and rough areas along both the inside and outside edges of multiple surfaces of a strut.

Moreover, most prior art filing and abrading device designs normally allow only one surface of a device to be placed against one work piece surface (or one edge of a surface) at a time. Thus for work pieces requiring the filing or abrading of multiple nonlinear surfaces (or edges thereof), when one work piece surface has been filed or abraded sufficiently, the position of the filing/abrading device and/or the work piece must normally be substantially adjusted in order for the next work piece (or object) surface or edge of a work piece surface to be filed. This repositioning may result in more time being required for filing a work piece. For example, in some cases it may take around two to three minutes to file all the edges of one strut end. The inefficiency of excessive repositioning may be compounded by many separate work pieces having surfaces needing to be smoothed. For example, it is not unusual for some projects utilizing cut strut channels to entail many cut strut ends with surfaces and/or edges that require filing.

SUMMARY OF THE INVENTION

Since filing work pieces having multiple nonlinear rough or sharp surfaces may require substantial repositioning of either the work piece or the device, it would be desirable if a metal file or abrading device existed that could file the sharp or rough surfaces of certain work pieces without having to substantially adjust the position of the work piece and/or the filing device in order to file each object surface or object edge. It would further be desirable if one particular embodiment of such a metal file or abrading device were designed to file the edges of a metal strut end with minimal repositioning of either the strut or device, and this in a relative safe and quick manner.

Embodiments of the hand-filing device described herein may allow for more filing multiple surfaces and/or edges of different nonlinear but substantially adjacent surfaces, with minimal adjusting required of the position of the device and/or the work piece, and this potentially in a relatively safe and quick manner. The device may comprise a hand-controlled part, a body, and several filing surfaces, which in some embodiments may be incorporated into a device end or ends. In some embodiments, the hand-controlled part may comprise the body, as well as a grip or handle. The shape or arrangement of the device embodiments' filing surfaces may be configured to the shape of at least some of the surfaces of the work piece or object (or edges thereof) intended to be filed. In some embodiments, one part or end of the device may be configured for placement against a work piece or object so that each filing surface of the device is placed against a separate work piece surface or edge to be filed. For example, since metal strut is normally comprised primarily of three sides forming a strut channel, where each side is basically perpendicular to any adjacent side, one embodiment of the device may comprise at least two filing surfaces, each filing surface normal to another filing surface, and with dimensions so that at least two filing surfaces are placed against separate strut surfaces (or edges or strut surfaces) to be filed.

With the device in such a position against the work piece or object, a person holding the device's hand-controlled part may apply pressure onto the work piece so that said pressure is transferred from at least a first filing surface of the device to at least a first surface or edge of the work piece/object. The device may also be moved in some predetermined direction (such as a forward and possibly backward direction) so that the surface or edge may be filed, and this movement may be repeated. At least a second work piece or object surface or edge thereof may also be filed in a similar manner, without the position of the device and/or the work piece having to be substantially altered. Consequently, the work piece/object surfaces and/or edges thereof may potentially be filed in less time in such a manner resulting in less risk of injury. The risk of injury may be further decreased in ways that will be apparent to those skilled in the arts to which the hand-filing device pertains, such as in one embodiment, by an ergonomically shaped handle facilitating a strong user grip. For instances where filing surfaces become worn or dulled from use, some embodiments may comprise removable and replaceable device ends or inserts.

In one embodiment, the device may comprise filing surfaces for filing both inner and outer surfaces or inner and outer surface edges of a work piece end (or object end). For example, since metal strut has a hollow interior, when cut, both the inner and outer edges of a cut strut end may be rough and/or dangerously sharp and in need of being filed/abraded. Thus, embodiments of the single hand-filing device may enable filing or both the inner and outer edges of a cut strut end. One embodiment may comprise filing surfaces for filing both inner and outer surfaces and/or inner and outer surfaces edges without substantial repositioning. Another embodiment may comprise filing surfaces where the inner filing surfaces and the outer filing surfaces are on separate ends of the device. However, both the aforementioned embodiments may allow filing of work piece (or object) surfaces and/or edges with less repositioning required in the manner described above, and therefore in a potentially relatively more quick and safe manner.

As mentioned above, some embodiments of the hand-filing device may have particular application for filing the cut ends (and surfaces) of metal strut, including both the inner and outer edges thereof. Furthermore, in one embodiment for filing a metal strut end, the device may comprise two separate device ends, one for filing inner edges, and one for filing outer edges. In another embodiment, separate device ends may be capable of filing both inner and outer edges, but each end may be designed for a different sized metal strut. For example, a first end of one embodiment may comprise surfaces having dimensions for filing and/or abrading a metal strut having one-inch sides, and a second end may comprise similar surfaces but having dimensions for filing and/or abrading metal strut having 1 and five-eighths of an inch sides. Other embodiments may comprise removable device ends or inserts, with each device end comprising surfaces having different sizes or dimensions, according to work piece or object end.

In some embodiments, the device may comprise a body partially resembling the shape of the work piece. For example, for a work piece in the shape of metal strut having basically three sides where each side is normal to any adjacent side, the cavity may have a similar basically three-sided shape so that the metal strut end may be partially inserted therein; or stated differently, the shape might resemble a cavity with substantially U-shaped cross sections, into which a portion of the work piece may fit. In embodiments having such a cavity, the cavity may be comprised of filing surfaces. In one such embodiment, filing surfaces for filing the outer edges of a metal strut end may be located on one wider side of the cavity, and filing surfaces for filing the inner edges of a metal strut end may be located on a shorter side of the cavity. In such style of embodiments, the filing surfaces for filing the inner edges may be incrementally angled towards the filing surfaces for filing the outer edges, and the filing surfaces for filing the outer edges may be incrementally angled towards the filing surfaces for filing the inner edges, forming a channel. In one embodiment, the channel may lead to an aperture through which shavings resulting from the filing process may exit the device. In another embodiment, the interior of the body of the device may be hollow and function as a chamber for collecting the resulting debris/shavings from filing the metal strut end. In addition to apertures for the exiting of the shavings from the device, in some embodiments, the exterior surfaces of the device may also comprise in certain strategically placed spots, windows or ports that permit the interior hollow cavity to be viewed to allow emptying of the debris/shavings at an appropriate time.

Other embodiments for filing a work piece (or object or in particular a strut end) may omit the cavity feature (as well as the hollow interior for collecting shavings) and depending on the arrangement of the work piece surfaces, may be shaped more like a sleeve to be inserted over the work piece end or the part thereof intended to be filed; or, alternatively, the work piece end or a part thereof might slide over the filing surfaces of the device; or the same device may, comprise separate ends comprising both features (one end comprising one such feature/design and another end the other feature/design). For example, to file a work piece comprising a metal strut end having basically three sides each side having an inner and outer surface, where each side is normal to each adjacent side, a first end of the device may comprise basically three strut-end shaped surfaces, each for filing an inner surface (and/or an edge) of the strut end; and a second device end may comprise basically three other strut-end shaped surfaces each for filing an outer surface of the strut end. Stated differently, in one such embodiment designed to file the edges of a metal strut end, a first and larger "female" end of the device may be configured for filing the outer edges of the strut end, and a second, possibly opposite, smaller "male" end of the device may be configured for filing the inner edges of the strut end. The first smaller end may fit inside the channel of the strut end, for filing the inner surfaces or edges of the strut end. The second, possibly oppositely situated, larger end may fit over the outside of the strut end, similar to a sleeve into which the strut end may be inserted. The first and second ends may be connected by the device body. In some embodiment, the widths of the filing surfaces of the second larger end may incrementally narrow as the length of the end approaches the second larger end. In this manner, pressure may increase against the outer edges of a work piece (e.g., strut) as the work piece is inserted further into the sleeve-like second end. Similarly, the widths of the surfaces of the second end may increase incrementally as the length approaches the first end. Thus, pressure may increase against the inner edges of a work piece (e.g., strut) as the work piece slides farther over the first end of the device. By applying pressure on the work piece edges in contact with the filing surfaces of the device, and while moving the device in a predetermined motion, the edges may be filed. Thus, the inner and outer edges of all the surfaces the metal strut end may be filed without the position of the work piece or the device having to be adjusted substantially to separately file each edge, potentially saving time and decreasing likelihood of injury.

In addition to decreasing risk of injury by reducing the amount of adjusting positions of the device and/or the work piece, in some embodiment protective hand-controlled parts (e.g., ergonomic grips, handles) may further assist in protecting the hand from inadvertent contact with edges of the work piece. For example, in the embodiment of the device comprising the cavity, the exterior may comprise an ergonomic handle facilitating a secure grip. In the embodiment of the device comprising separate device ends for filing the inner and outer edges of a metal strut end, the larger end of the device with the filing/abrading surfaces on the inside may comprise an exterior surface comprising hard, durable material, which may also comprise in a hand-controlled part for safe gripping and for manually applying pressure. Said exterior surface of the larger end/body of the device in said embodiment may comprise a separate part than the filing surfaces and may be removable from the filing surfaces. In one embodiment, the exterior surface/device body may comprise a hard casing, which in one embodiment may comprise a hard plastic molding, and the filing surfaces of the larger end may comprise an insert that may be easily removed and/or replaced, which insert in one embodiment may form the shape of the outside of a metal strut channel. Similarly, the filing surfaces of the smaller end of said embodiment may comprise a separate part than the device body and the filing surfaces may comprise an easily replaceable/removable insert, the shape of which may in one embodiment resemble the inside of a metal strut channel.

Device shape, size, and dimensions may of course vary according to embodiment—for example, according to work piece and surfaces (and/or edges thereof) intended to be filed. For example, in embodiments for filing a metal strut end having a casing/shell with a semi-hollow exterior, the basic dimensions of the device might be 2"×2"×6", with one end of the device comprising a cavity adapted to fit the end of a strut having one inch sides; some such embodiments may also comprise other device ends adapted to file the end of a strut having 1⅝" sides. The components of the device may be comprised of various materials, such as for example but not limited to, a body/casing of forged plastic. Some embodiments may be comprised of filing surfaces having varying teeth designs and arrangement or of abrading surfaces. Intended motion to file work piece edges or surfaces may also vary according to embodiment (depending for example on whether the embodiment is intended to abrade).

Some embodiments may also comprise attachable conventional files or abrasive devices for touching up certain areas of surfaces or edges of an object such as a metal strut. For example, in one embodiment a small file may be stored within the casing of the device for touching up the smaller/shorter filing surfaces of a strut end, which in some variants may be accessed in switch-blade like fashion. The same or other embodiments may also be comprised of a larger file for touching up the wider/larger surfaces of a strut end. In some embodiments, such a larger file may be incorporated into the bottom of an insert or into a hinged bottom side of the casing.

The above description and listed alternative embodiments are considered that of some embodiments only. It is understood that the embodiments shown in the drawings and described below are merely for illustrative purposes and not intended to limit scope. Alterations and modifications, therefore, and such further applications as would occur to those skilled in the relevant art(s), are also contemplated.

DETAILED DESCRIPTION OF THE PREFERRED EMBODIMENTS

"Filing" is defined herein to include both filing and abrading. "Inner filing surfaces" are defined to mean those filing surfaces for filing the inner edges of a surface and "outer filing surfaces" are defined to mean those filing surfaces for filing the outer edges of a surface, regardless of whether the inner filing surfaces or the outer filing surfaces are found on what might otherwise be considered the inside or outside surfaces of a device.

Figure 3:
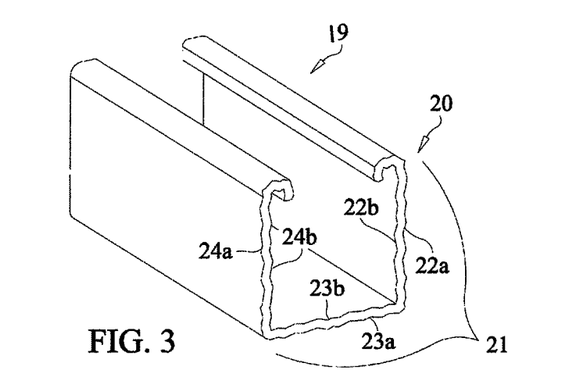
FIG. 3 is a side perspective view of a strut having surfaces and edges thereof requiring filing.
Figure 4A:
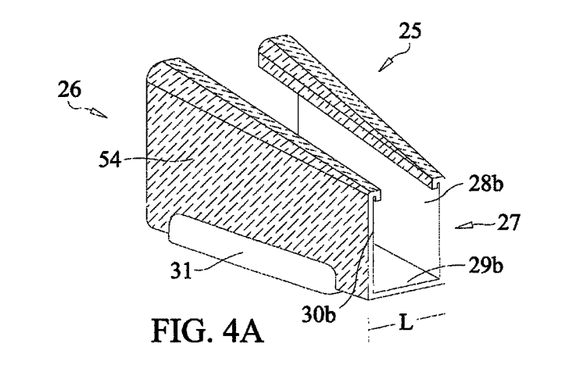
FIG. 4A is a front perspective view of another embodiment of a hand filing device.
Figure 4B:
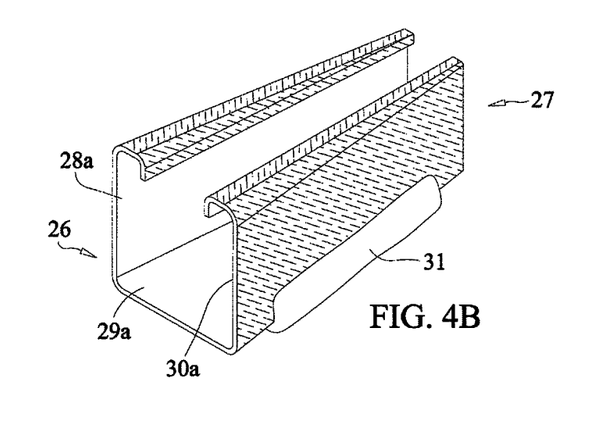
FIG. 4B is a back perspective view of the device of FIG. 4A.

Embodiments of the filing device described herein may have application for filing the surfaces or edges of objects with different shapes or dimensions, and particular application for objects having multiple surfaces where one surface is at a right angle to another surface, which configuration might increase the difficulty of filing the object. One specific example of such an object, as shown in FIG. 3, may be a metal strut 19, or more specifically, a piece of a metal strut 19 that has been cut along its latitudinal axis. The resulting cut strut end 20 may have rough or dangerously sharp edges or warping 21 along both the outer edges 22*a*, 23*a*, 24*a* and the inner edges 22*b*, 23*b*, 24*b* thereof, the filing of which might be more easily accomplished and/or facilitated using embodiments of the device described herein.

Figure 1:
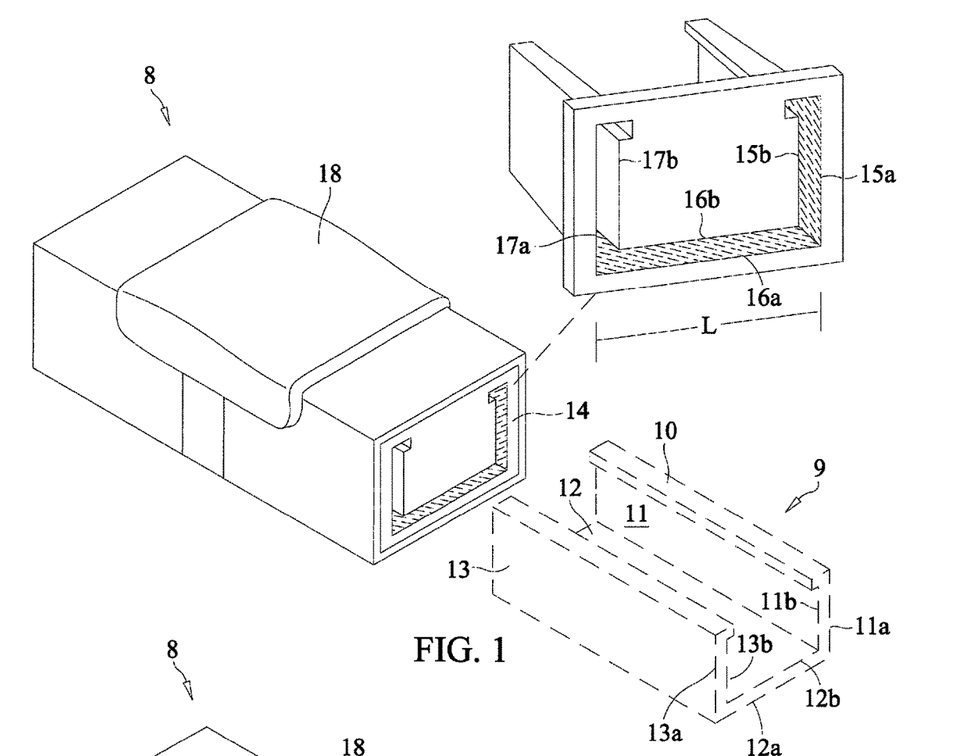
FIG. 1 is a side perspective view of an embodiment of a hand filing device and an object to be filed, and a close-up perspective view of a device end.

FIG. 1 illustrates an embodiment of a hand filing device 8 for filing a similar genre of object 9 having an object end 10 comprising several sides 11, 12, 13 having outside surfaces 11*a*, 12*a*, 13*a* and inside surfaces 11*b*, 12*b*, 13*b*. The embodiment of the hand filing device 8 may have a device end 14 for filing the edges of both the outside surfaces 11*a*, 12*a*, 13*a* and the inside surfaces 11*b*, 12*b*, 13*b* of sides 11, 12, 13 of the end of the object 9. The device end 14 may be comprised of two sets of filing surfaces, one set of outer filing surfaces 15a, 16a, 17a for filing the edges of the outside surfaces 11a, 12a, 13a and one set of inner filing surfaces 15b, 16b, 17b for filing the edges of the inside surfaces 11b, 12b, 13b of the object sides 11, 12, 13. The outer filing surfaces 15a, 16a, 17a and the inner filing surfaces 15b, 16b, 17b of the device end 14 may extend further into the device 14. In the particular embodiment 8 shown in FIG. 1, as the outer filing surfaces 15a, 16a, 17a and the inner filing surfaces 15b, 16b, 17b extend further into the device 14, the outer filing surfaces 15a, 16a, 17a may be incrementally angled inward toward the inner filing surfaces 15b, 16b, 17b, while the inner filing surfaces 15b, 16b, 17b may be incrementally angled outward toward the outer filing surfaces 15a, 16a, 17a, and the cross-sectional length L of each filing surface 15a, 16a, 17a, 15b, 16b, 17b, may decrease incrementally as the filing surfaces 15a, 16a, 17a, 15b, 16b, 17b extend further into the device embodiment 8. The device embodiment 8 may also comprise a hand-controlled part 18, or grip or handle.

The end 10 of the object 9 may be inserted into the device end 14 and placed so that outer filing surfaces 15a, 16a, 17a are aligned with the outside surfaces 11a, 12a, 13a of the object end 10, or so that the inner filing surfaces 15b, 16b, 17b are aligned with the inside surfaces 11b, 12b, 13b of the object end 10, or so that both the outer filing surfaces 15a, 16a, 17a and the inner filing surfaces 15b, 16b, 17b are aligned with the outside surfaces 11a, 12a, 13a and the inside surfaces 11b, 12b, 13b respectively, or so that outer filing surfaces 15a, 16a, 17a are aligned with the edges of the outside surfaces 11a, 12a, 13a of the object end 10, or so that the inner filing surfaces 15b, 16b, 17b are aligned with the edges of the inside surfaces 11b, 12b, 13b of the object end 10, or so that both the outer filing surfaces 15a, 16a, 17a and the inner filing surfaces 15b, 16b, 17b are aligned with the both the edges of the outside surfaces 11a, 12a, 13a and the edges of the inside surfaces 11b, 12b, 13b respectively, and at the same time. By moving the hand-controlled part 18 in a predetermined manner—for example, in the embodiment shown this movement may be some form of a back and forth motion about the longitudinal axis of the device 14—and while applying pressure against either some of the outside surfaces 11a, 12a, 13a or edges thereof by some of the outer filing surfaces 15a, 16a, 17a, or against some of the inside surfaces 11b, 12b, 13b or edges thereof by some of the inner filing surfaces 15b, 16b, 17b, some of the surfaces 11a, 12a, 13a, 11b, 12b, 13b or edges thereof of the object 9 may be filed by the filing surfaces 15a, 16a, 17a, 15b, 16b, 17b of the device 8. Said filing may potentially occur, moreover, without requiring substantial repositioning of the object 9 with respect to the filing device 8 in order to switch from filing some inside surface 11b, 12b, 13b (and/or edge thereof) to filing another inside surface 11b, 12b, 13b (and/or edge thereof), or to switch from filing some outside surface 11a, 12a, 13a (and/or edge thereof) to filing a different outside surface 11a, 12a, 13a (and/or edge thereof), or, in the embodiment of the device end shown 14, to switch from filing some inside surface 11b, 12b, 13b (and/or edge thereof) to filing some outside surface 11a, 12a, 13a (and/or edge thereof), or vice versa.

Particular configurations of filing surfaces may vary according to embodiment. For example, another hand-filing device embodiment 25, as shown in FIGS. 5A and 5B, similar to the embodiment of the device shown in FIGS. 1 and 2, may also comprise both inner filing surfaces 28b, 29b, 30b (FIG. 5A) and outer filing surfaces 28a, 29a, 30a (FIG. 5B) for filing respectively the inside surfaces 11b, 12b, 13b (and/or edges thereof) and the outside surfaces 11a, 12a, 13a (and/or edges thereof) of the sides 11, 12, 13 of an object 9—for example, more specifically for filing the rough and/or dangerously sharp edges 21 along the outer surfaces 22a, 23a, 24a and the inner surfaces 22b, 23b, 24b of a cut strut end 20—yet said filing inner filing surfaces 28b, 29b, 30b and outer filing surfaces 28a, 29a, 30a of the device embodiment 25 shown in FIGS. 5A and 5B may be located on opposite device ends 26, 27, rather than the same end 14 as shown in FIGS. 1 and 2.

Figure 2:
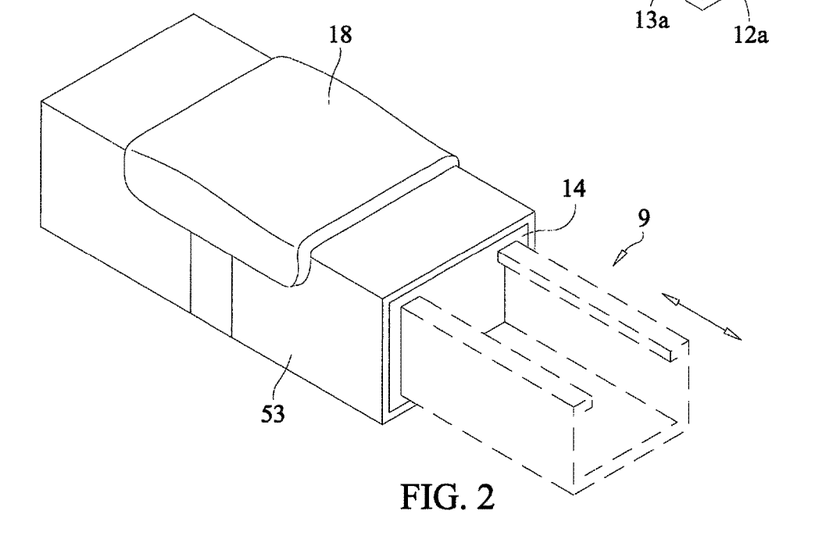
FIG. 2 is a side perspective view of the device of FIG. 1 and the object of FIG. 1 positioned with respect to the device for filing.

In addition, similar to the embodiment 8 shown in FIGS. 1 and 2, the embodiment of the hand-filing device 25 shown in FIGS. 5A and 5B may comprise outer filing surfaces 28a, 29a, 30a that extend from the first device end 26 and as they extend, incrementally angle inward towards the inner filing surfaces 28b, 29b, 30b. In the device embodiment 25 shown, the inner filing surfaces 28b, 29b, 30b may also be incrementally angled toward the outer filing surfaces 28a, 29a, 30a. In the device embodiment 25 shown, the cross-sectional length L of the filing surfaces 28a, 29a, 30a, 28b, 29b, 30b may also incrementally increase from the first device end 26 to the second device end 27. The embodiment of the hand-filing device 25 may also comprise a hand-controlled part 31, or grip or handle.

This embodiment of the hand-filing device 25 may allow an object (e.g., 9) having surfaces for filing (e.g., 11a, 12a, 13a, 11b, 12b, 13b), such as for example the cut strut end 20 of FIG. 3 to be inserted into the first device end 26 so that the strut outer surfaces 22a, 23a, 24a (and/or edges thereof) are aligned with the outer filing surfaces 28a, 29a, 30a. Then, by moving the hand-controlled part 31 in a predetermined manner—for example, by a back and forth motion about the longitudinal axis of the device 25—and while applying pressure against some of the outside surfaces 22a, 23a, 24a (and/or edges thereof) by some of the outer filing surfaces 28a, 29a, 30a, some of the outside surfaces 22a, 23a, 24a (and/or edges thereof) may be filed, and this without requiring substantial repositioning of either the strut piece 19 or the hand-filing device 25 in order to file a different outside edge 22a, 23a, 24a. Similarly, the cut strut end 20 may be positioned over the second device end 27 so that the cut strut end's 19 inner edges 22b, 23b, 24b align with the inner filing surfaces 28b, 29b, 30b of the hand-filer device 25. Then, also by moving the hand-controlled part 31 in a predetermined manner—for example, by some form of a back and forth motion about the longitudinal axis of the device 25—and while applying pressure against some of the inner edges 22b, 23b, 24b by some of the inner filing surfaces 28b, 29b, 30b, some of the inner filing surfaces 22b, 23b, 24b, may likewise be filed, and this without requiring substantial repositioning of either the strut piece 19 or the hand-filing device 25 to file a different inner edge 22b, 23b, 24b.

Embodiments and shapes of the device may vary according to desired function and preference. In particular, the precise styles, designs, dimensions, and configurations of filing surfaces, and device ends comprising such filing surfaces, may vary according to the surfaces (and/or edges thereof) of an object to be filed. For example, as shown in FIG. 5, although one device end 14a may comprise filing surfaces 15a, 16a, 17a, 15b, 16b, 17b having certain sizes and dimensions, other device ends 14b, 14c, 14d (of a similar style of the device embodiment 8 shown in FIGS. 1-2) may comprise filing sets of surfaces 32, 33, 34 of different sizes and cross-sectional lengths.

In addition, the amount or distance filing surfaces 14a, 15a, 16a, 14b, 15b, 16b of a device end 14a (for the similar style of the device embodiment 8 shown in FIGS. 1-2) may extend into the device 8a from the device end 14a, and the degree and direction (if any) to which the filing surfaces 14a, 15a, 16a, 14b, 15b, 16b are incrementally angled may also vary according to object, user objective, preference, or desired filing effects. For example, another embodiment of a hand-filing device 35 (somewhat similar in appearance to the embodiment 8 shown in FIGS. 1-2) may comprise a device end 36a comprising filing surfaces 37b, 38b, 39b, 37a, 38a, 39a that may not extend substantially into the device 35 (or into a hollow cavity 40 inside the body/casing 41 of the device 35), or that may not be angled incrementally in any direction. Moreover, similar to the embodiment 8a shown in FIG. 5, other variations of device ends 36b, 36c, 36d may also comprise filing sets of surfaces 42, 43, 44, 45 of varying sizes and cross-sectional lengths.

Figure 5:
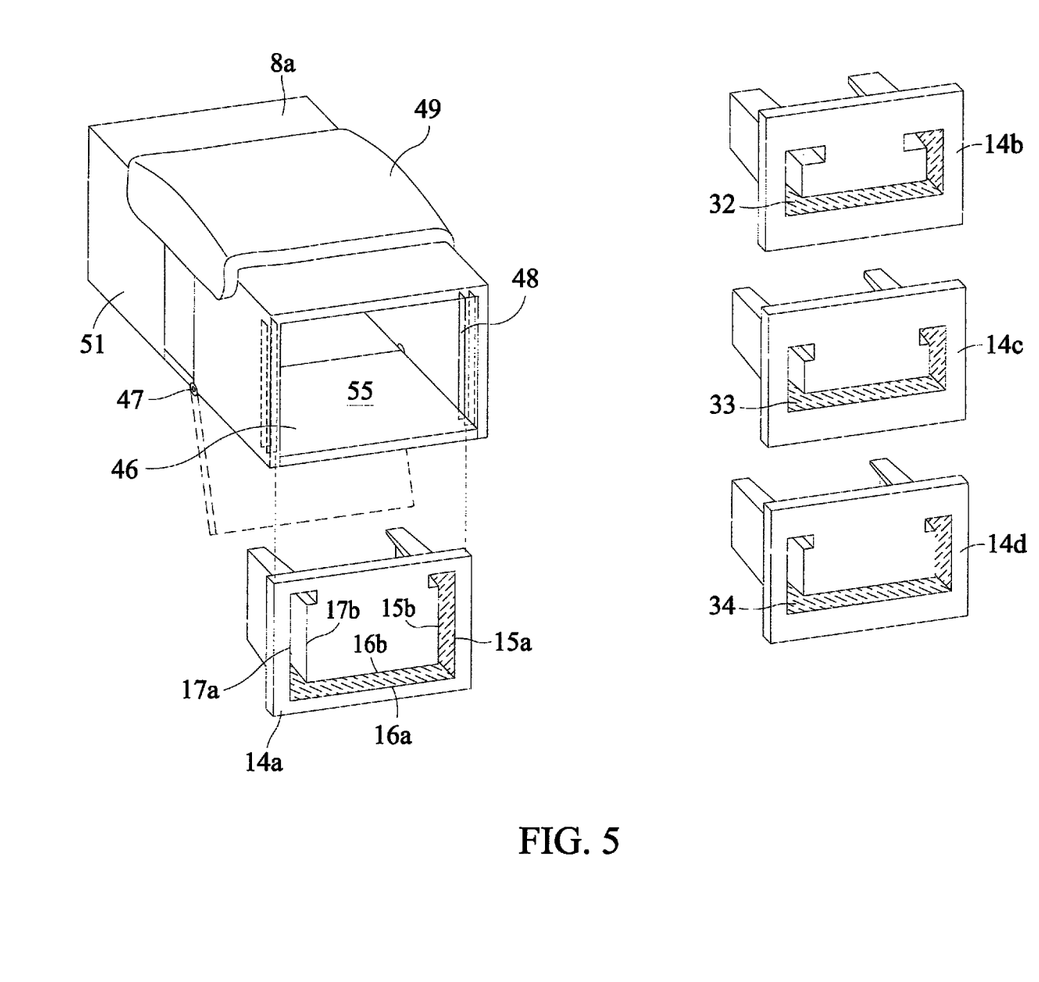
FIG. 5 is a front perspective view of another embodiment of a hand filing device having removable device ends for filing.
Figure 6:
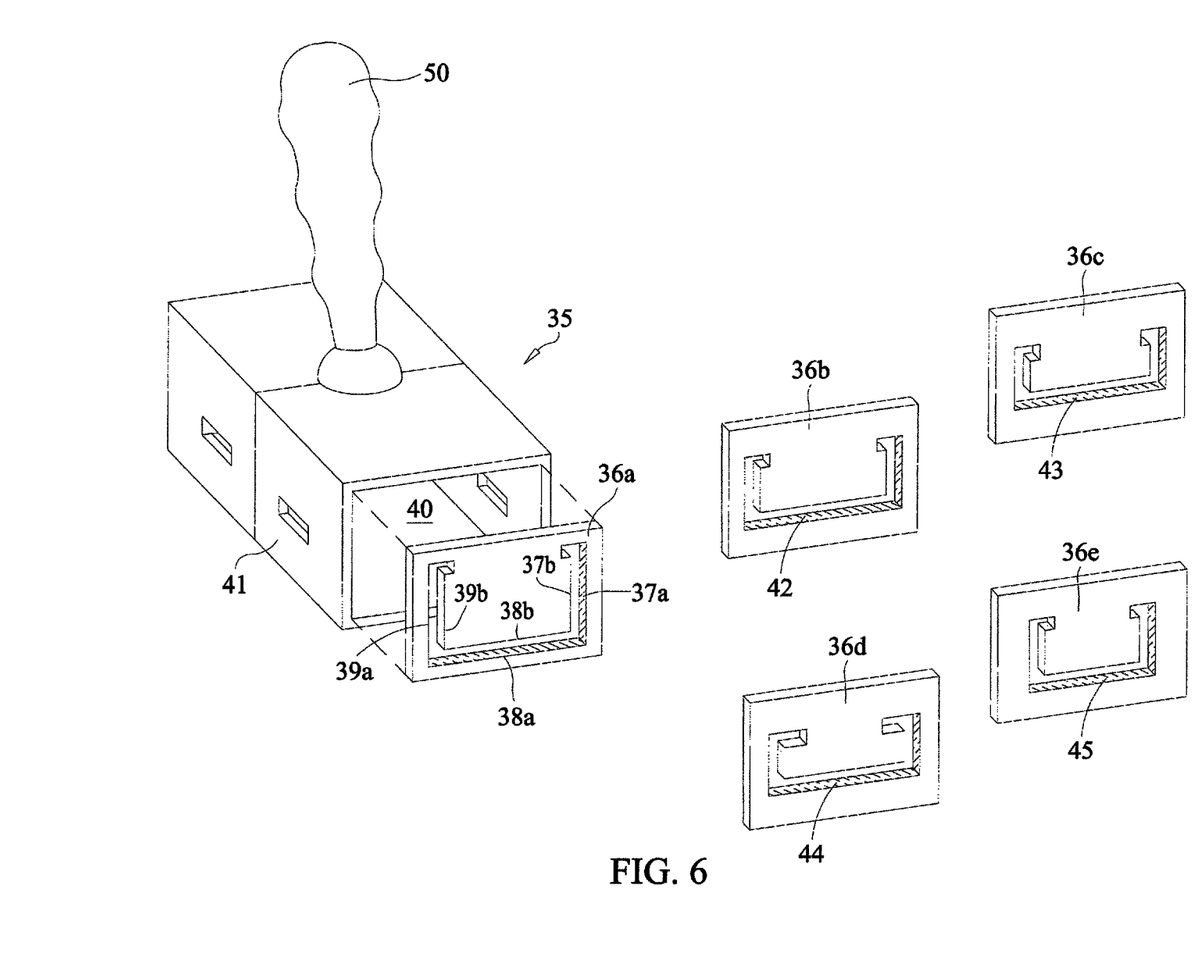
FIG. 6 is a front perspective view of another embodiment of a hand filing device, and removable device ends for filing.

Moreover, the device ends 14a, 14b, 14c, 14d of the device embodiment 14 shown in FIG. 5, and the device ends 36a, 36b, 36c, 36d, 36e of the device embodiment shown in FIG. 6, may be removable, interchangeable, and replaceable (for example, for when a particular filing surface has worn dull through usage). The manner in which the removable, interchangeable, and replaceable device ends may be inserted or attached to the device may also vary according to embodiment. For example, in the embodiment of the device 35 shown in FIG. 6, device ends 36a, 36b, 36c, 36d, 36e may fit directly onto the device, and in the embodiment of the device 8a shown in FIG. 5, a bottom side 46 of the device 8a may be hinged 47 and fall away, allowing the device ends 36a, 36b, 36c, 36d, 36e to slide securely up and into the device 8a in tracks of grooves 48.

Figure 7:
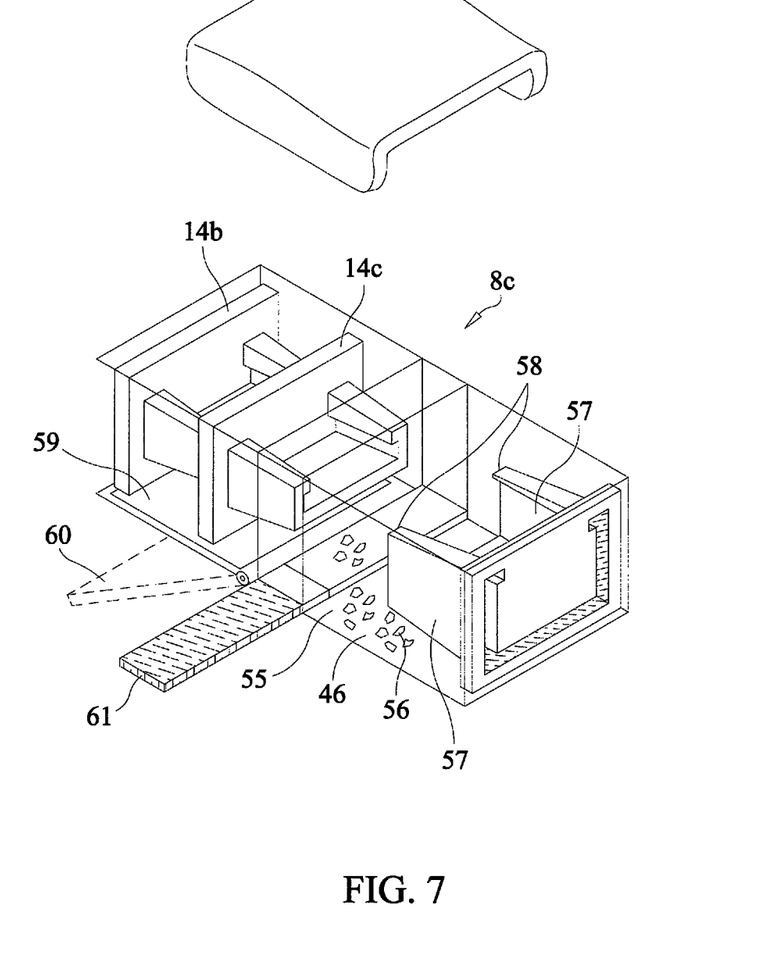
FIG. 7 is side perspective view of the inside of another embodiment device of a hand filing device.

As shown in FIGS. 4A, 4B, 5, and 6, the hand controlled parts (i.e., handle/grip) 18, 31, 49, 50 and the bodies 41, 51, 52, 53, 54 of different embodiments may vary in design and features. For example, embodiments having casing/bodies 41, 51, 52, 53 with hollow cavities 40, 55 may collect shavings 56 resulting from the filing, as shown in FIG. 7. For device embodiments 8, 8a, 8c (FIGS. 1, 5) comprising device ends 14, 14a, 14b, 14c, 14d where filing surfaces 15a, 16a, 17a, 15b, 16b, 17b may form somewhat of an enclosed channel/chamber 57, the channel/chamber 57 may comprise a back end 58 that is enclosed, allowing the shavings 56 from filing to exit the chamber 57 and into the cavity 55 (which may then exit the cavity 55 of the casing 51 by the opening of the bottom side 46), as shown in FIG. 7. As also shown in FIG. 7, one embodiment of the hand-filer 8c may also comprise a storage compartment 59 for storing other device ends 14b, 14c, which may be accessible by a second hinged bottom side 60 of the device 8c. In addition, embodiments of the device 8c may comprise a file 61 allowing for touching up particular areas or surfaces 11a, 12a, 13a, 11b, 12b, 13b, 22a, 23a, 24a, 22b, 23b, 24b (or edges thereof) of an object 9, 19 being filed (shown in FIG. 1, 3, 7), which file 61 may be conveniently stored when not in use in a non-obtrusive and non-protruding manner but when in use may extend or even detach from the device embodiment 8c.

I claim:

1. A device for manually filing at least two edge surfaces of a three-dimensionally shaped object, the device comprising:
    a hand-controlled part, having a body, and at least one device end connected to the body, the device end comprising at least two adjacent flat filing surfaces arranged at a right angle facing toward each other and each filing surface having a length of at least 0.4 inches and configured for placement against the at least two adjacent and right-angled object edge surfaces so that movement of the hand-controlled part while applying pressure from the filing surfaces onto the object edge surfaces files the object edge surfaces.

2. The device of claim 1, wherein the filing surfaces are configured to file at least two edge surfaces simultaneously.

3. The device of claim 1, wherein the device end comprises at least three filing surfaces with each filing surface adjacent to and arranged at a right angle to another filing surface.

4. The device of claim 3, wherein the object comprises both inner edge surfaces and outer edge surfaces; and
    wherein the filing surfaces comprise both inner filing surfaces for filing the inner edges surfaces, and outer filing surfaces for filing the outer edge surfaces.

5. The device of claim 4, wherein the inner filing surfaces are incrementally angled towards the outer filing surfaces, and the outer filing surfaces are incrementally angled towards the inner filing surfaces.

6. The device of claim 5, wherein the device comprises at least two device ends, a first device end and a second device end, and
    wherein the first device end comprises the inner filing surfaces, and the second device end comprises the outer filing surfaces.

7. The device of claim 5, wherein the same device end comprises both the inner filing surfaces and the outer filing surfaces, and the inner filing surfaces and outer filing surfaces form a channel configured for placement of at least a portion of the inner edge surfaces and the outer edge surfaces therein.

8. The device of claim 7, wherein the side of the channel formed by the inner filing surfaces and the outer filing surfaces opposite from where the inner edge surfaces and the outer edge surfaces are inserted is not enclosed, for the exiting of shavings from the channel.

9. The device of claim 4, wherein the body comprises a hollow casing for the storing of shavings resulting from filing of the edge surfaces therein.

10. The device of claim 1, wherein the filing surfaces are removable and replaceable.

11. A device for manually filing at least three surfaces of a three-dimensionally shaped object end, the device comprising:
    a hand-controlled part, a body, and at least one device end connected to both the hand-controlled part and the body, the device end comprising at least three flat filing surfaces, each filing surface adjacent to at least one other of the filing surfaces, and each filing surface arranged at an angle of less than 180 degrees with each adjacent filing surface, and each filing surface having a length of at least 0.4 inches, wherein the at least three filing surfaces are adapted to the shape of the at least three object end surfaces and configured for placement against the at least three adjacent and nonlinearly arranged object end surfaces so that movement of the hand-controlled part while applying pressure from the filing surfaces onto the object end surfaces files at least one of the object surfaces.

12. The device of claim 11, wherein each filing surface is nonlinearly arranged with each adjacent filing surface at an angle greater than thirty degrees.

13. The device of claim 12, wherein the at least three object end surfaces comprise both at least three inner object surfaces and at least three outer object surfaces; and
    wherein the filing surfaces comprise both at least three inner filing surfaces for filing the inner object end surfaces and at least three outer filing surfaces for filing the outer object end surfaces.

14. The device of claim 13, wherein the at least three inner object surfaces comprise at least three inner edges and the outer object surfaces comprise at least three outer edges; and
   wherein the at least three inner filing surfaces are configured to file the at least three inner edges, and the at least three outer filing surfaces are configured to file the at least three outer edges.

15. The device of claim 14, wherein the inner filing surfaces are incrementally angled towards the outer filing surfaces and the outer filing surfaces are incrementally angled towards the inner filing surfaces.

16. The device of claim 14, wherein the at least three inner filing surfaces are configured for placement against the at least three inner edges so that at least two inner edges are simultaneously filed; and
   wherein the at least three outer filing surfaces are configured for placement against the at least three outer edges so that at least two outer edges are simultaneously filed.

17. The device of claim 16, wherein the device comprises a first device end and a second device end, the first device end opposite from the second device and being separated by the body, and
   wherein the first device end comprises the at least three inner filing surfaces and the second device end comprises the at least three outer filing surfaces.

18. The device of claim 16, wherein the at least three inner filing surfaces and the at least three outer filing surfaces form a channel configured for insertion of the at least three inner edges and the at least three outer edges therein.

19. The device of claim 14, wherein the at least three inner filing surfaces and the at least three outer filing surfaces form an aperture configured for insertion of the at least three inner edges and the at least three outer edges therein.

20. The device of claim 13, wherein the at least three inner filing surfaces and the at least three outer filing surfaces form an aperture configured for insertion of the at least three inner object surfaces and the at least three outer object surfaces therein.

21. The device of claim 12, wherein the at least one device end comprising filing surfaces comprises a replaceable insert removable from the body.

22. The device of claim 12, wherein the filing surfaces are replaceable and interchangeable with other filing surfaces.

23. A device for filing the inner and outer edges of the surfaces of a strut end, the device comprising:
   a hand-controlled part, a body connected to the hand-controlled part, the body comprising a first set of inner filing surfaces and a second set of outer filing surfaces, the first set of filing surfaces for filing inner edges of the surfaces of the strut end, and the second set of filing surfaces for filing outer edges of the surfaces of the strut end, each of the first set of filing surfaces and each of the second set of filing surfaces having a length of at least 0.4 inches;
   wherein, the first set of inner filing surfaces are adapted to the shape of the inside of the strut channel, for placement substantially over the inner edges of the surfaces of the strut end, so that when so placed and utilizing the hand-controlled part to apply pressure from the inner filing surfaces against at least some of the inner edges of the surfaces of the strut end and to move the inner filing surfaces with respect to the inner edges in a predetermined manner, at least some of the inner edges are filed;
   wherein, the second set of outer filing surfaces are adapted to the shape of the outside of the strut channel, for placement substantially over the outer edges of the surfaces of the strut end, so that when so placed and utilizing the hand-controlled part to apply pressure from the outer filing surfaces against at least some of the outer edges of the surfaces of the strut end and to move the outer filing surfaces with respect to the outer edges in a predetermined manner, at least some of the outer edges are filed;
   whereby, the device is configured to file the inner edges of the surfaces of the strut end without substantial repositioning of the device, and is also configured to file the outer edges of the surfaces of the strut end without substantial repositioning of the device.

24. The device of claim 23, wherein the body comprises a device end comprised of the first set of inner filing surfaces and the second set of outer filing surfaces, and the first set of inner filing surfaces and the second set of outer filing surfaces form an aperture for placement of the inner edges and the outer edges of the surfaces of the strut end therein for filing;
   whereby, when the inner edges and the outer edges of the surfaces of the strut end are so placed in the aperture formed by the first set of inner filing surfaces and the second set of outer filing surfaces, the device is configured to file both the inner edges and the outer edges of the surfaces of the strut end without substantial repositioning of the device.

25. The device of claim 24, wherein the device end is removable and replaceable.

26. The device of claim 24, wherein the cross-sectional lengths of the inner filing surfaces and the outer filing surfaces decrease as they extend away from the device end.

* * * * *